(12) United States Patent
Wang

(10) Patent No.: US 11,841,524 B2
(45) Date of Patent: Dec. 12, 2023

(54) BACKLIGHT MODULE AND DISPLAY DEVICE

(71) Applicant: GUANGZHOU CHINA STAR OPTOELECTRONICS SEMICONDUCTOR DISPLAY TECHNOLOGY CO., LTD., Guangzhou (CN)

(72) Inventor: Hao Wang, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/765,248

(22) PCT Filed: Mar. 29, 2022

(86) PCT No.: PCT/CN2022/083627
§ 371 (c)(1),
(2) Date: Mar. 30, 2022

(65) Prior Publication Data
US 2023/0341604 A1    Oct. 26, 2023

(30) Foreign Application Priority Data

Mar. 16, 2022  (CN) .......................... 202210259936.0

(51) Int. Cl.
*F21V 8/00*    (2006.01)
(52) U.S. Cl.
CPC .......... *G02B 6/0028* (2013.01); *G02B 6/0031* (2013.01); *G02B 6/0065* (2013.01); *G02B 6/0083* (2013.01); *G02B 6/0088* (2013.01); *G02B 6/0051* (2013.01); *G02B 6/0068* (2013.01)

(58) Field of Classification Search
CPC  G02F 1/1333; G02F 1/133314; G02B 6/0031
See application file for complete search history.

(56) References Cited

FOREIGN PATENT DOCUMENTS

| CN | 204576022 U | 8/2015 |
|----|-------------|--------|
| CN | 107945664 A | 4/2018 |
| CN | 109036152 A | 12/2018 |
| CN | 109387981 A | 2/2019 |
| CN | 109613758 A | 4/2019 |
| CN | 109785753 A | 5/2019 |
| CN | 209118668 U | 7/2019 |
| CN | 110515241 A | 11/2019 |

(Continued)

*Primary Examiner* — Karabi Guharay
(74) *Attorney, Agent, or Firm* — The Roy Gross Law Firm, LLC; Roy Gross (57) ABSTRACT

A backlight module and a display device are disclosed. The backlight module includes a backlight light board assembly, a reflective layer, and a light-transmitting layer. The backlight light board assembly includes at least two backlight light boards spliced to each other, a splicing gap is defined between two backlight light boards spliced to each other, the reflective layer covers the splicing gap, and the light-transmitting layer is disposed on one side of the reflective layer away from the splicing gap. By disposing the reflective layer and the light-transmitting layer, light can be reflected to the light-transmitting layer by the reflective layer, thereby improving a light extraction effect at the splicing gap.

19 Claims, 3 Drawing Sheets

(56) References Cited

FOREIGN PATENT DOCUMENTS

| | | | | |
|---|---|---|---|---|
| CN | 111208673 | A | 5/2020 | |
| CN | 111208673 | A * | 5/2020 | ....... G02F 1/133603 |
| CN | 111312087 | A | 6/2020 | |
| CN | 112509477 | A | 3/2021 | |
| CN | 212809628 | U | 3/2021 | |
| CN | 112596303 | A | 4/2021 | |
| CN | 113327515 | A | 8/2021 | |
| CN | 214098031 | U | 8/2021 | |
| CN | 214375710 | U | 10/2021 | |
| CN | 215834163 | U * | 2/2022 | |
| CN | 215834163 | U | 2/2022 | |
| JP | H10325953 | A | 12/1998 | |
| WO | 2016045159 | A1 | 3/2016 | |

* cited by examiner

BACKLIGHT MODULE AND DISPLAY DEVICE

CROSS REFERENCE TO RELATED APPLICATIONS

This application is a National Phase of PCT Patent Application No. PCT/CN2022/083627 having International filing date of Mar. 29, 2022, which claims the benefit of priority of Chinese Patent Application No. 202210259936.0, filed Mar. 16, 2022, the contents of which are all incorporated herein by reference in their entirety.

FIELD OF INVENTION

The present disclosure relates to the field of display technologies, and more particularly, to a backlight module and a display device.

BACKGROUND OF INVENTION

In recent years, since sub-millimeter light-emitting diodes (mini-LEDs) have advantages of high brightness, good brightness uniformity, and high color gamut saturation, backlight modules using the mini-LEDs as a backlight source are gradually favored by end consumers. However, a size of the mini-LEDs is small. When the mini-LEDs are used as the backlight source, especially when used in large-sized backlight modules, a plurality of mini-LED light boards spliced together are usually needed to realize a need for the large-sized backlight modules emitting light in whole surface. Splicing gaps will form between spliced mini-LED light boards. Since there is no mini-LED lamp bead at the splicing gaps, when light on both sides of the splicing gaps is incident thereon, poor display phenomena, such as bright lines or dark lines, will occur at the splicing gaps, thereby affecting a light extraction effect of whole backlight module.

Technical problem: an embodiment of the present disclosure provides a backlight module and a display device to solve a problem of poor display at splicing gaps of backlight light boards in backlight modules.

SUMMARY OF INVENTION

An embodiment of the present disclosure provides a display module. The display module includes:

a backlight light board assembly including at least two backlight light boards spliced to each other, wherein, a splicing gap is defined between two backlight light boards spliced to each other, and the at least two backlight light boards have a light-emitting surface;

a reflective layer disposed on the light-emitting surface of the at least two backlight light boards and covering the splicing gap; and a light-transmitting layer disposed on one side of the reflective layer away from the splicing gap.

Optionally, in some embodiments of the present disclosure, the reflective layer has a side surface extending along a length direction of the splicing gap, and the light-transmitting layer extends to the light-emitting surface of the at least two backlight light boards along the side surface.

Optionally, in some embodiments of the present disclosure, the backlight module includes a plurality of light-transmitting layers disposed in a stack in a direction away from the backlight light board assembly, wherein, refractive indexes of two adjacent light-transmitting layers are different.

Optionally, in some embodiments of the present disclosure, refractive indexes of the light-transmitting layers are all different.

Optionally, in some embodiments of the present disclosure, refractive indexes of the light-transmitting layers increase in a direction away from the reflective layer in sequence, or the refractive indexes of the light-transmitting layers decrease in the direction away from the reflective layer in sequence.

Optionally, in some embodiments of the present disclosure, one side of the reflective layer away from the backlight light board assembly is a convex surface, and/or one side of the light-transmitting layer away from the reflective layer is a convex surface.

Optionally, in some embodiments of the present disclosure, a total thickness of the light-transmitting layers is greater than or equal to 1 mm and is less than or equal to 2 mm.

Optionally, in some embodiments of the present disclosure, the backlight module includes a light-transmitting adhesive layer connecting the reflective layer to the light-transmitting layers.

Optionally, in some embodiments of the present disclosure, another light-transmitting adhesive layer is disposed between two adjacent light-transmitting layers.

Optionally, in some embodiments of the present disclosure, refractive indexes of the light-transmitting adhesive layer and the light-transmitting layers are different.

Optionally, in some embodiments of the present disclosure, a material of the light-transmitting layer includes acrylic, and a material of the reflective layer includes polycarbonate or polyethylene terephthalate.

Optionally, in some embodiments of the present disclosure, the backlight module further includes a backplate and a connecting part, wherein, one side of the backlight light board assembly away from the reflective layer is attached to the backplate, and the connecting part is disposed in the splicing gap and connects the reflective layer to the backplate.

Optionally, in some embodiments of the present disclosure, one side of the reflective layer facing the connecting part is provided with a first positioning slot, one side of the connecting part facing the reflective layer is provided with a first positioning part that protrudes corresponding to the first positioning slot, and the first positioning part is inserted into the first positioning slot; and/or the side of the connecting part facing the reflective layer is provided with a second positioning slot, the side of the reflective layer facing the connecting part is provided with a second positioning part that protrudes corresponding to the second positioning slot, and the second positioning part is inserted into the second positioning slot.

Optionally, in some embodiments of the present disclosure, one side of the backplate facing the connecting part is provided with a third positioning slot, the connecting part is provided with a third positioning part that protrudes corresponding to the third positioning slot, and the third positioning part is inserted into the third positioning slot; and/or one side of the connecting part facing the backplate is provided with a fourth positioning slot, the backplate is provided with a fourth positioning part that protrudes corresponding to the fourth positioning slot, and the fourth positioning part is inserted into the fourth positioning slot.

Optionally, in some embodiments of the present disclosure, the backlight module includes a plurality of connecting parts disposed in the splicing gap and arranged at intervals along a length direction of the splicing gap.

Optionally, in some embodiments of the present disclosure, the connecting part is in strip shape and extends along a length direction of the splicing gap.

Optionally, in some embodiments of the present disclosure, the backlight module further includes a diffusing plate disposed on one side of the light-transmitting layer away from the backlight light board assembly, wherein, a spacing between the diffusing plate and the at least two backlight light boards is greater than or equal to 25 mm and is less than or equal to 35 mm.

Optionally, in some embodiments of the present disclosure, the backlight light board assembly includes a plurality of backlight light boards, the splicing gap is defined between any two adjacent backlight light boards, the reflective layer and the light-transmitting layer are disposed corresponding to each splicing gap, and the diffusing plate abuts the light-transmitting layer.

Optionally, in some embodiments of the present disclosure, the backlight light boards are arranged in an array.

Correspondingly, an embodiment of the present disclosure further provides a display device, which includes a display screen and the backlight module mentioned above, wherein, the display screen is connected to the backlight module.

Beneficial effect: the backlight module in the embodiment of the present disclosure includes a backlight light board assembly, a reflective layer, and a light-transmitting layer. The backlight light board assembly includes at least two backlight light boards spliced to each other, a splicing gap is defined between two backlight light boards spliced to each other, and the at least two backlight light boards have a light-emitting surface. The reflective layer is disposed on the light-emitting surface of the at least two backlight light boards and covers the splicing gap. The light-transmitting layer is disposed on one side of the reflective layer away from the splicing gap. By disposing the reflective layer and the light-transmitting layer at the splicing gap of the backlight light board assembly, light emitted from the backlight light boards can be reflected to the light-transmitting layer by the reflective layer, mixed in the light-transmitting layer, and then emitted outside. Therefore, a light extraction effect at the splicing gap between the backlight light boards can be improved, poor phenomena such as bright lines or dark lines at the splicing gap can be prevented, thereby improving overall display effect of the backlight module.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

Elements in the drawings are designated by reference numerals listed below.

| reference numeral | element |
| --- | --- |
| 10 | display device |
| 100 | backlight module |
| 110 | backplate |
| 111 | third positioning slot |
| 112 | fourth positioning part |
| 120 | backlight light board assembly |
| 121 | backlight light boards |
| 1211 | lamp beads |
| 1212 | splicing gap |
| 1213 | light-emitting surface |
| 130 | reflective layer |
| 131 | first positioning slot |
| 132 | second positioning part |
| 140 | light-transmitting layer |
| 150 | connecting part |
| 151 | first positioning part |
| 152 | second positioning slot |
| 153 | third positioning part |
| 154 | fourth positioning slot |
| 160 | diffusing plate |
| 200 | display screen |
| 300 | driving circuit |
| 400 | housing |

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure, and are not used to limit the disclosure. In the present disclosure, in the case of no explanation to the contrary, the orientation words used such as "on" and "under" usually refer to upper and lower directions of the device in actual use or working state, specifically the directions in the drawings, and "inside" and "outside" refer to the outline of the device.

The embodiments of the present disclosure provide a backlight module and a display device. They will be described in detail in the following. It should be noted that an order of description in the following embodiments is not meant to limit a preferred order of the embodiments.

When manufacturing the backlight module, mini-LEDs may be used as backlight sources. However, a size of the mini-LEDs is small. Especially when the mini-LEDs are used in large-sized backlight modules, a plurality of backlight light boards provided with the mini-LEDs spliced together are needed to realize a need for the large-sized backlight modules emitting light in whole surface. However, splicing gaps between spliced backlight light boards will cause the backlight module to have poor display.

Figure 1:
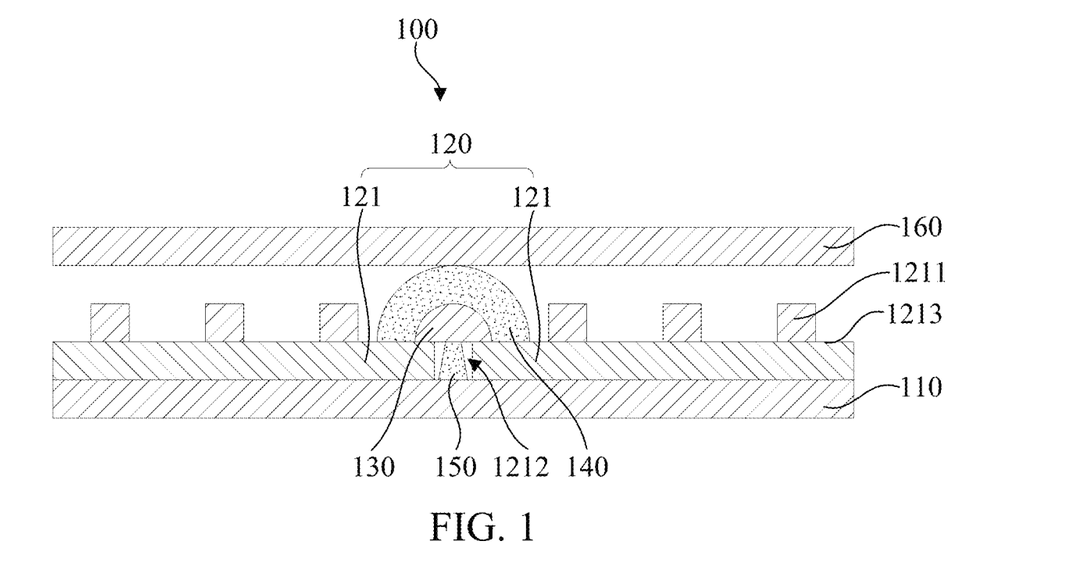
FIG. 1 is a schematic structural diagram of a backlight module according to an embodiment of the present disclosure.

As shown in FIG. 1, the backlight module 100 in the present disclosure includes a backlight light board assembly 120, and the backlight light board assembly 120 includes at least two backlight light boards 121 spliced to each other. By splicing at least two backlight light boards 121, it can prevent from using a single backlight light board 121 which has an overly large size, thereby increasing a difficulty of manufacturing. Meanwhile, it can also satisfy different requirements of the backlight module 100 for size, shape, and display effect, and expand an application scope of the backlight module 100.

The backlight light boards 121 are used as the backlight sources of the backlight module 100, and have a light-emitting surface 1213 and a back surface, and the light-emitting surface 1213 is one side provided with lamp beads 1211. No matter whether the backlight light board assembly 120 is assembled using a connection structure or is directly bonded, there is a splicing gap 1212 between two backlight light boards 121 that are spliced, and no lamp beads 1211 are disposed at the splicing gap 1212. When light on both sides of the splicing gap 1212 is incident thereon, poor display phenomena, such as bright lines or dark lines, will occur at the splicing gap 1212, thereby affecting a light extraction effect of whole backlight module 100.

Further, the backlight module 100 includes a reflective layer 130. The reflective layer 130 is disposed on the light-emitting surface 1213 of the backlight light boards 121 and covers the splicing gap 1212 between the two backlight light boards 121 that are spliced. Light emitted from adjacent lamp beads 1211 on both sides of the splicing gap 1212 can be reflected by disposing the reflective layer 130 to cover the splicing gap 1212, thereby improving the display quality at the splicing gap 1212.

Wherein, the reflective layer 130 may be attached to the backlight light board assembly 120 by pasting, so that an attachment position of the reflective layer 130 can be adjusted accordingly according to adjustment of a splicing method of the backlight light boards 121, thereby allowing a combination between the reflective layer 130 and the backlight light boards 121 to be more flexible and diverse.

Optionally, the backlight module 100 includes a light-transmitting layer 140. The light-transmitting layer 140 is disposed on one side of the reflective layer 130 away from the splicing gap 1212. That is, after covering the splicing gap 1212 with the reflective layer 130, a layer of light-transmitting layer 140 is subsequently disposed to cover a position corresponding to the splicing gap 1212. In one aspect, the disposition of the light-transmitting layer 140 may increase an amount of light emitted from the backlight module 100 corresponding to the position of the splicing gap 1212. Therefore, during an assembly process of the backlight module 100, a structure above the reflective layer 130 can be prevented from directly being in contact with the reflective layer 130 and causing the light extraction effect in the contact area to be poorer. In another aspect, the disposition of the light-transmitting layer 140 can allow light reflected by the reflective layer 130 to be mixed in the light-transmitting layer 140. Meanwhile, since the light-transmitting layer 140 has a certain refraction effect, it can adjust an angle of emergence of emitted light, thereby further improving the display quality of the backlight module 100 corresponding to the splicing gap 1212.

Wherein, the light-transmitting layer 140 may be attached to the reflective layer 130 by pasting, so that it can be adjusted accordingly according to a specific structure and a disposed position of the reflective layer 130 and an actual requirement of the light-transmitting layer 140, thereby allowing a combination between the light-transmitting layer 140 and the reflective layer 130 to be more flexible and diverse.

In the backlight module 100 of this embodiment, by disposing the reflective layer 130 and the light-transmitting layer 140 at the splicing gap 1212 of the backlight light board assembly 120, light emitted from the backlight light boards 121 can be reflected to the light-transmitting layer 140 by the reflective layer 130, mixed in the light-transmitting layer 140, and then emitted outside. Therefore, the light extraction effect at the splicing gap 1212 between the backlight light boards 121 can be improved, poor phenomena such as bright lines or dark lines at the splicing gap 1212 can be prevented, thereby improving overall display effect of the backlight module 100.

Optionally, the reflective layer 130 has a side surface extending along a length direction of the splicing gap 1212. That is, a part of the side surface of the reflective layer 130 facing the splicing gap 1212 covers the splicing gap 1212, and the light-transmitting layer 140 is disposed on the part of the side surface of the reflective layer 130 away from the splicing gap 1212. Wherein, a coverage area of the light-transmitting layer 140 on the side surface of the reflective layer 130 may be adjusted accordingly according to actual design requirements. As long as it can ensure that the disposition of the light-transmitting layer 140 can adjust the angle of emergence of the emitted light in the area corresponding to the splicing gap 1212.

Wherein, the light-transmitting layer 140 extends to the light-emitting surface 1213 of the backlight light boards 121 along the side surface of the reflective layer 130. That is, the light-transmitting layer 140 extends along the side surface of the reflective layer 130 to wrap the reflective layer 130. Therefore, the emitted light of the lamp beads 1211 on both sides of the splicing gap 1212 can be fully mixed in the light-transmitting layer 140 after reflected by the reflective layer 130. Meanwhile, expanding the coverage area of the light-transmitting layer 140 on the reflective layer 130 is beneficial to the adjustment of the angle of emergence of the emitted light corresponding to the splicing gap 1212, thereby improving the overall display effect of the backlight module 100.

In some embodiments, the light-transmitting layer 140 partially extends to the light-emitting surface 1213 of the backlight light boards 121 along the side surface of the reflective layer 130. That is, the light-transmitting layer 140 partially covers the side surface of the reflective layer 130. The coverage area and a coverage position can be adjusted according to a reflection situation of the reflective layer 130 to the emitted light of the lamp beads 1211 on both sides of the splicing gap 1212. Therefore, the position corresponding to the splicing gap 1212 can be ensured to have a sufficient amount of light extraction and a suitable angle of emergence, thereby improving the display effect at the splicing gap 1212.

In some embodiments, in addition to the part of the side surface of the reflective layer 130 that covers the splicing gap 1212, the light-transmitting layer 140 extends along a remaining part of the side surface of the reflective layer 130. That is, the light-transmitting layer 140 completely covers the side surface of the reflective layer 130, thereby realizing full coverage of the reflective layer 130 by the light-transmitting layer 140. This structural design allows the emitted light of the lamp beads 1211 on both sides of the splicing gap 1212 and incident on the reflective layer 130 to pass through the light-transmitting layer 140 first, and an angle of incidence thereof on the reflective layer 130 can be adjusted under the refraction effect of the light-transmitting layer 140. The emitted light enters the light-transmitting layer 140 for mixing after reflected by the reflective layer 130 and then emits from the light-transmitting layer 140, and the angle of emergence is adjusted under the refraction effect of the light-transmitting layer 140, thereby improving the display effect at the splicing gap 1212.

Figure 2:
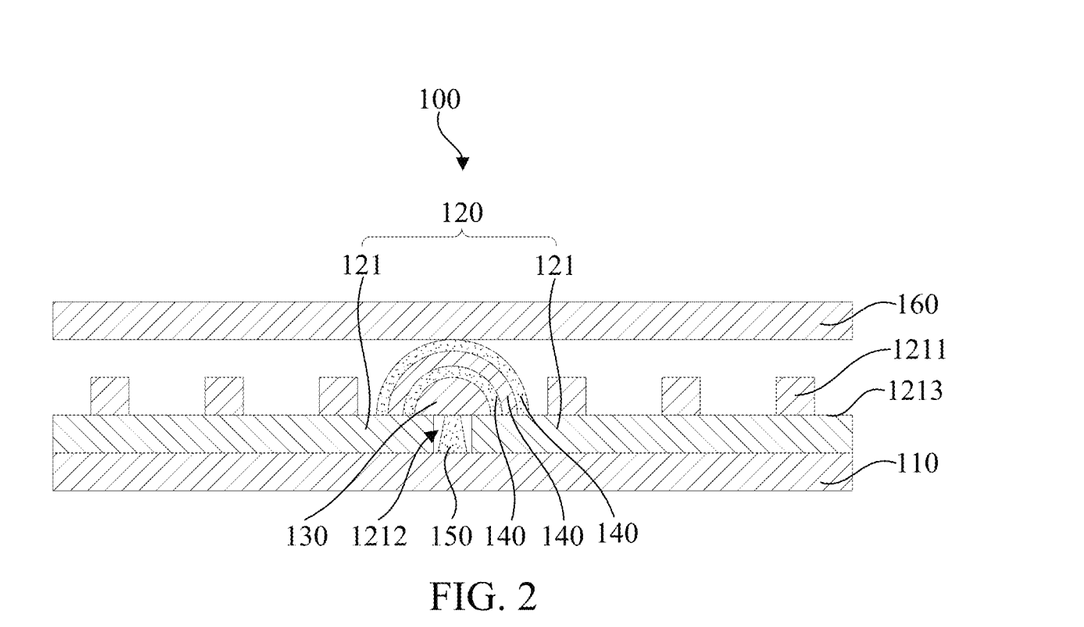
FIG. 2 is a schematic structural diagram of another backlight module according to an embodiment of the present disclosure.

Optionally, as shown in FIG. 2, the backlight module 100 includes a plurality of light-transmitting layers 140 disposed in a stack in a direction away from the backlight light board assembly 120. That is, the plurality of light-transmitting layers 140 are stacked on the side of the reflective layer 130 away from the splicing gap 1212. Therefore, the emitted light reflected by the reflective layer 130 passes through the plurality of light-transmitting layers 140 layer by layer, so the angle of emergence of the emitted light can be further optimized under the refraction effect of the plurality of light-transmitting layers 140, thereby improving the display quality of the backlight module 100.

Wherein, refractive indexes of two adjacent light-transmitting layers 140 are different. That is, when light emitted from the lamp beads 1211 on both sides of the splicing gap 1212 passes through the plurality of light-transmitting layers 140 and is incident on the reflective layer 130, the angle of incidence will change when the light passes every layer of the light-transmitting layers 140. After reflected by the reflective layer 130, the angle of emergence of the emitted light will also change when the light passes every layer of the light-transmitting layers 140 during passing through the plurality of light-transmitting layers 140. The adjustment of the angle of emergence of the emitted light can be strengthened by making the refractive indexes of two adjacent light-transmitting layers 140 be different, thereby further improving the display quality of the backlight module 100.

In some embodiments, refractive indexes of the light-transmitting layers 140 increase in a direction away from the reflective layer 130 in sequence. That is, when the emitted light of the lamp beads 1211 on both sides of the splicing gap 1212 is incident on the reflective layer 130, the emitted light passes the light-transmitting layers 140 in a way from a light-transmitting layer 140 having a high refractive index to a light-transmitting layer 140 having a low refractive index, so the angle of incidence of the emitted light can be adjusted toward a same direction during passing through the light-transmitting layers 140. After reflected by the reflective layer 130, the emitted light passes the light-transmitting layers 140 in a way from the light-transmitting layer 140 having the low refractive index to the light-transmitting layer 140 having the high refractive index, so the angle of emergence of the emitted light can be adjusted toward an opposite direction during passing through the light-transmitting layers 140. This structural design allows the angles of incidence and emergence of the emitted light of the lamp beads 1211 to be able to be adjusted regularly, thereby facilitating adjustment of an range of actual light-emitting angles.

In some embodiments, the refractive indexes of the light-transmitting layers 140 decrease in the direction away from the reflective layer 130 in sequence. That is, when the emitted light of the lamp beads 1211 on both sides of the splicing gap 1212 is incident on the reflective layer 130, the emitted light passes the light-transmitting layers 140 in the way from the light-transmitting layer 140 having the low refractive index to the light-transmitting layer 140 having the high refractive index, so the angle of incidence of the emitted light can be adjusted toward the same direction during passing through the light-transmitting layers 140. In contrary, after reflected by the reflective layer 130, the emitted light passes the light-transmitting layers 140 in the way from the light-transmitting layer 140 having the high refractive index to the light-transmitting layer 140 having the low refractive index, so the angle of emergence of the emitted light can be adjusted toward the opposite direction during passing through the light-transmitting layers 140. This structural design allows the angles of incidence and emergence of the emitted light of the lamp beads 1211 to be able to be adjusted regularly, thereby facilitating the adjustment of the range of actual light-emitting angles.

It should be noted that the high and low refractive indexes mentioned in the above examples are only relative values of the refractive indexes between the light-transmitting layers 140, and do not refer to an actual value of a refractive index of each layer. In addition to the example of the refractive indexes of two adjacent light-transmitting layers 140 being different, in an actual design process, the refractive indexes of the light-transmitting layers 140 can all be set to be different from each other. Wherein, the actual value of the refractive index of each light-transmitting layer 140 and relative values therebetween can be adjusted accordingly according to actual design requirements and simulation results, as long as it can ensure that the emitted light of the lamp beads 1211 on both sides of the splicing gap 1212 can improve the light extraction effect at the splicing gap 1212 and that poor display such as bright lines or dark lines at the splicing gap 1212 can be prevented, and they are not specific limited herein.

Optionally, one side of the reflective layer 130 away from the backlight light board assembly 120 is a convex surface. That is, the side of the reflective layer 130 away from the backlight light board assembly 120 is an arc structure to allow the reflective layer 130 be arched when attached to the light-emitting surface 1213 of the backlight light boards 121. That is, a reflective surface of the reflective layer 130 used to receive the emitted light of the lamp beads 1211 on both sides of the splicing gap 1212 is an arc structure as a whole. This structural design can increase an effective reflective area of the reflective surface of the reflective layer 130 and improve the utilization rate of the emitted light. Meanwhile, the arc structure of the reflective surface can also increase a range of the angle of incidence of the emitted light incident on the reflective layer 130, thereby being beneficial to the adjustment of a final light-emitting angle of the emitted light.

Optionally, one side of the light-transmitting layer 140 away from the reflective layer 130 is a convex surface. That is, the side of the light-transmitting layer 140 away from the reflective layer 130 is an arc structure to allow the light-transmitting layer 140 be arched when attached to the reflective layer 130. That is, an incident surface of the light-transmitting layer 140 when incident by the emitted light of the lamp beads 1211 on both sides of the splicing gap 1212 and a light-emitting surface of the light-transmitting layer 140 when the emitted light is reflected by the reflective layer 130 are arc structures. This structural design can increase ranges of the angles of incidence and emergence of the emitted light on the light-transmitting layer 140, thereby being beneficial to the adjustment of the light-emitting angle corresponding to the splicing gap 1212, thereby improving the light extraction effect at the splicing gap 1212 of the backlight module 100.

In some embodiments, the side of the reflective layer 130 away from the backlight light board assembly 120 and the side of the light-transmitting layer 140 away from the reflective layer 130 are both convex surfaces. Since the light-transmitting layer 140 extends along the side surface of the reflective layer 130, when the side of the reflective layer 130 away from the backlight light board assembly 120 is the convex surface, one side of the light-transmitting layer 140 facing the reflective layer 130 is a concave surface. That is, the light-transmitting layer 140 is an arc-shaped structure as a whole and has two opposite curved surfaces. This structural design can increase an angular range of the emitted light of the lamp beads 1211 on both sides of the splicing gap 1212 in the entire propagation path, thereby being further beneficial to the adjustment of the light-emitting angle corresponding to the splicing gap 1212, thereby improving the light extraction effect at the splicing gap 1212 of the backlight module 100.

It should be noted that in addition to a structure having the convex surface, the reflective layer 130 and the light-transmitting layer 140 may also have other types of structures such as columnar, forward-tapered, or inverted-tapered. The specific structures thereof may be adjusted according to actual use requirements and light-emitting situations at the splicing gap 1212, and will not be specifically limited herein as long as the disposition of the reflective layer 130 and the light-transmitting layer 140 can effectively improve the light extraction effect on positions corresponding to the splicing gap 1212.

Optionally, a total thickness of the light-transmitting layers 140 is greater than or equal to 1 mm and is less than or equal to 2 mm. If the total thickness of the light-transmitting layers 140 is overly large, overall thickness of the backlight module 100 will be overly large, which will make a size of the backlight module 100 be larger, thereby being not beneficial to assembly and application of the backlight module 100. If the total thickness of the light-transmitting layers 140 is overly small, a spacing between the reflective layer 130 and a structure above the light-transmitting layers 140 will become smaller, thereby reducing the amount of light extraction on the positions corresponding to the splicing gap 1212. In addition, the total thickness of the light-transmitting layers 140 being overly small will also cause the emitted light to not mix well in the light-transmitting layer 140, thereby affecting quality of light extraction on the positions corresponding to the splicing gap 1212.

In the actual manufacturing process, the total thickness of the light-transmitting layers 140 may be set as 1 mm, 1.2 mm, 1.5 mm, 1.8 mm, or 2 mm. Therefore, a sufficient amount of light extraction at the splicing gap 1212 can be ensured, the light extraction effect on the positions corresponding to the splicing gap 1212 can be improved, and the overall thickness of the backlight module 100 can be prevented from being overly large and affecting the use of the backlight module 100. Specific thicknesses of the light-transmitting layers 140 can be adjusted according to actual application requirements, and are not specific limited herein.

Optionally, the backlight module 100 includes a light-transmitting adhesive layer connecting the reflective layer 130 to the light-transmitting layer 140, thereby ensuring a connection strength between the light-transmitting layer 140 and the reflective layer 130. Meanwhile, light transmittance of the light-transmitting adhesive layer can allow the emitted light of the lamp beads 1211 on both sides of the splicing gap 1212 to effectively pass through the light-transmitting layer 140, irradiate on the reflective layer 130, and successfully be emitted out of the light-transmitting layer 140 after reflected by the reflective layer 130, thereby ensuring normal light extraction on the positions corresponding to the splicing gap 1212.

When the backlight module 100 includes the plurality of light-transmitting layers 140, the light-transmitting adhesive layer may also be disposed between each two adjacent light-transmitting layers 140, thereby ensuring a connection strength between the light-transmitting layers 140, thereby ensuring overall structural stability of the backlight module 100.

It should be noted that refractive indexes of the light-transmitting adhesive layer and the light-transmitting layers 140 are different, so disposing the light-transmitting adhesive layer between the light-transmitting layers 140 and the reflective layer 130 can ensure the connection stability between the light-transmitting layers 140 and the reflective layer 130, and the light-emitting angle of the emitted light on the positions corresponding to the splicing gap 1212 can also be improved by a refractive index relationship between the light-transmitting adhesive layer and the light-transmitting layers 140. Similarly, by disposing the light-transmitting adhesive layer between two adjacent light-transmitting layers 140, the light-transmitting adhesive layer can play a role of connection and a role of refraction like the light-transmitting layers 140, thereby being further beneficial to optimize the light-emitting angle of the emitted light on the positions corresponding to the splicing gap 1212.

Optionally, in the embodiment of the present disclosure, a material of the light-transmitting layers 140 includes materials having good light transmittance, such as acrylic, to ensure the positions corresponding to the splicing gap 1212 to have maximum light transmittance. In an actual design process, the refractive indexes of the light-transmitting layers 140 may be adjusted by designing each component in acrylic materials to meet different design requirements. A material of the reflective layer 130 includes polycarbonate or polyethylene terephthalate. A surface of the reflective layer 130 is a diffuse reflection layer having high reflectivity to reflect the light emitted from the lamp beads 1211 on both sides of the splicing gap 1212, thereby improving image quality on the positions corresponding to the splicing gap 1212.

Optionally, the backlight module 100 further includes a backplate 110, and one side of the backlight light board assembly 120 away from the reflective layer 130 is attached to the backplate 110. The backplate 110 has a certain supporting effect on the backlight light boards 121 by attaching the backlight light board assembly 120 onto the backplate 110, thereby ensuring the overall structural stability of the backlight light board assembly 120. Meanwhile, the disposition of the backplate 110 can allow the backlight light board assembly 120 to be directly connected to other structures by the backplate 110 during installing, thereby simplifying installation of the backlight light board assembly 120.

The backlight module 100 further includes a connecting part 150 disposed in the splicing gap 1212 and connecting the reflective layer 130 to the backplate 110. That is, between the reflective layer 130, the backlight light board assembly 120, and the backplate110, in addition to the bonding between the reflective layer 130 and the backlight light board assembly 120 and the bonding between the backlight light board assembly 120 and the backplate 110, the reflective layer 130 is also connected to the backplate 110 by the connecting part 150. Therefore, the overall structural stability of the backlight module 100 can be further improved, which can reduce a risk of shaking between the backlight light board assembly 120 and the backplate 110 during use of the backlight module 100.

Figure 3:
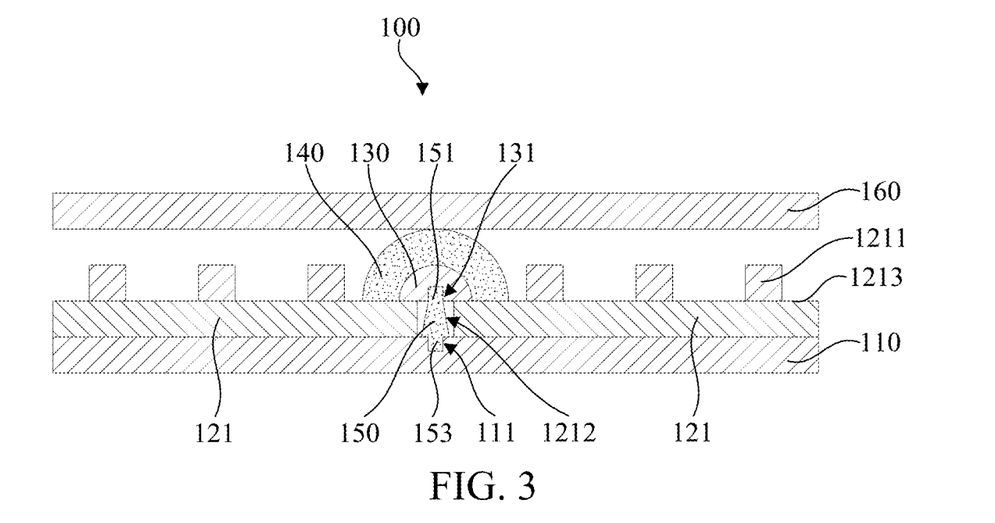
FIG. 3 is a schematic structural diagram of yet another backlight module according to an embodiment of the present disclosure.
Figure 4:
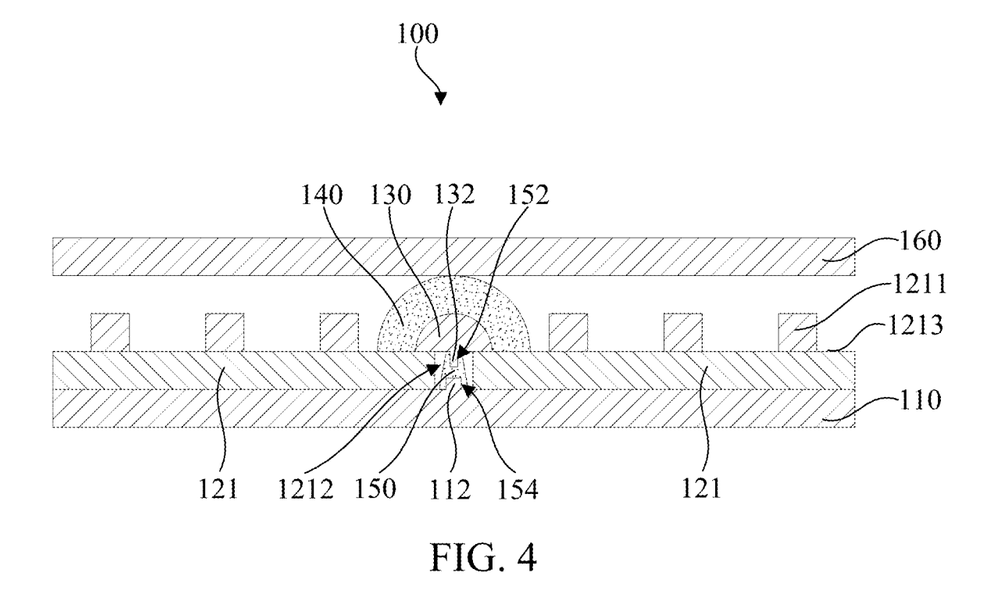
FIG. 4 is a schematic structural diagram of still another backlight module according to an embodiment of the present disclosure.

Optionally, as shown in FIGS. 3 and 4, one side of the reflective layer 130 facing the connecting part 150 is provided with a first positioning slot 131, one side of the connecting part 150 facing the reflective layer 130 is provided with a first positioning part 151 that protrudes corresponding to the first positioning slot 131, and the first positioning part 151 is inserted into the first positioning slot 131, thereby connecting the reflective layer 130 to the connecting part 150. Wherein, a bottom surface of the first positioning slot 131 or a surface of the first positioning part 151 is provided with an adhesive layer, thereby ensuring a stable connection between the first positioning part 151 and the reflective layer 130. By the setting of matching the first positioning slot 131 and the first positioning part 151, a disposed position of the reflective layer 130 can be located, relative stability between the reflective layer 130 and the connecting part 150 can also be enhanced, and the risk of shaking between the reflective layer 130 and the backlight light board assembly 120 can be reduced.

In some embodiments, the side of the connecting part 150 facing the reflective layer 130 is provided with a second positioning slot 152, the side of the reflective layer 130 facing the connecting part 150 is provided with a second positioning part 132 that protrudes corresponding to the second positioning slot 152, and the second positioning part 132 is inserted into the second positioning slot 152, thereby connecting the reflective layer 130 to the connecting part 150. Wherein, a bottom surface of the second positioning slot 152 or a surface of the second positioning part 132 is provided with the adhesive layer, thereby ensuring a stable connection between the second positioning part 132 and the connecting part 150. By the setting of matching the second positioning slot 152 and the second positioning part 132, the disposed position of the reflective layer 130 can be located, the relative stability between the reflective layer 130 and the connecting part 150 can also be enhanced, and the risk of shaking between the reflective layer 130 and the backlight light board assembly 120 can be reduced.

In some embodiments, the side of the reflective layer 130 facing the connecting part 150 is simultaneously provided with the first positioning slot 131 and the second positioning part 132, and the side of the connecting part 150 facing the reflective layer 130 is provided with the first positioning part 151 and the second positioning slot 152. During the connection process, the first positioning part 151 is inserted into the first positioning slot 131, and the second positioning part 132 is inserted into the second positioning slot 152 at a same time. This structural design can further enhance the relative stability between the reflective layer 130 and the connecting part 150, thereby ensuring the backlight module 100 to be used stably.

Optionally, one side of the backplate 110 facing the connecting part 150 is provided with a third positioning slot 111, the connecting part 150 is provided with a third positioning part 153 that protrudes corresponding to the third positioning slot 111, and the third positioning part 153 is inserted into the third positioning slot 111 to allow the third positioning part 153 to be connected to the backplate 110. Wherein, a bottom surface of the third positioning slot 111 or a surface of the third positioning part 153 is provided with the adhesive layer, thereby ensuring a stable connection between the third positioning part 153 and the backplate 110. By the setting of matching the third positioning part 153 and the third positioning slot 111, a disposed position of the connecting part 150 can be located, and relative stability between the connecting part 150 and the backplate 110 can also be enhanced, thereby enhancing relative stability between the reflective layer 130, the backlight light board assembly 120, and the backplate 110.

In some embodiments, one side of the connecting part 150 facing the backplate 110 is provided with a fourth positioning slot 154, the backplate 110 is provided with a fourth positioning part 112 that protrudes corresponding to the fourth positioning slot 154, and the fourth positioning part 112 is inserted into the fourth positioning slot 154 to allow the fourth positioning part 112 to be connected to the connecting part 150. Wherein, a bottom surface of the fourth positioning slot 154 or a surface of the fourth positioning part 112 is provided with the adhesive layer, thereby ensuring a stable connection between the fourth positioning part 112 and the connecting part 150. By the setting of matching the fourth positioning part 112 and the fourth positioning slot 154, the disposed position of the connecting part 150 can be located, and the relative stability between the connecting part 150 and the backplate 110 can also be enhanced, thereby enhancing the relative stability between the reflective layer 130, the backlight light board assembly 120, and the backplate 110.

In some embodiments, the side of the backplate 110 facing the connecting part 150 is simultaneously provided with the third positioning slot 111 and the fourth positioning part 112, and the side of the connecting part 150 facing the backplate 110 is provided with the third positioning part 153 and the fourth positioning slot 154. During the connection process, the third positioning part 153 is inserted into the third positioning slot 111, and the fourth positioning part 112 is inserted into the fourth positioning slot 154 at a same time. This structural design can further enhance the relative stability between the connecting part 150 and the backplate 110, thereby ensuring the backlight module 100 to be used stably.

Optionally, the backlight module 100 includes a plurality of connecting parts 150 disposed in the splicing gap 1212 and arranged at intervals along the length direction of the splicing gap 1212. By disposing the plurality of connecting parts 150 at intervals along the length direction of the splicing gap 1212, the reflective layer 130 and the backplate 110 can be aligned to each other by a plurality of positions, thereby allowing the disposed position of the reflective layer 130 to be more accurate. Meanwhile, the structural stability between the reflective layer 130, the backlight light board assembly 120, and the backplate 110 can be further improved, thereby ensuring the backlight module 100 to be used stably.

It should be noted that the connecting part 150 may be directly set as a strip structure extending along the length direction of the splicing gap 1212, so that the reflective layer 130 can be connected to the connecting part 150 in an entire extending direction of the splicing gap 1212. Therefore, the connection stability between the reflective layer 130 and the connecting part 150 can be improved, and a structural design of the reflective layer 130, the connecting part 150, and the backplate 110 can also be simplified, thereby improving production efficiency.

Optionally, the backlight module 100 further includes a diffusing plate 160 disposed on one side of the light-transmitting layer 140 away from the backlight light board assembly 120. The disposition of the diffusing plate 160 can ensure the emitted light of the lamp beads 1211 on the backlight light boards 121 to be effectively emitted, and is also beneficial to dispositions of other functional structures above the light-transmitting layer 140, thereby ensuring overall structural stability of the backlight module 100.

Wherein, a spacing between the diffusing plate 160 and the backlight light boards 121 is greater than or equal to 25 mm and is less than or equal to 35 mm. If the spacing between the diffusing plate 160 and the backlight light boards 121 is overly large, an overall size of the backlight module 100 will be larger, thereby causing an increase in overall weight of the backlight module 100, and is not beneficial to installation and use of the backlight module 100. If the spacing between the diffusing plate 160 and the backlight light boards 121 is overly small, a light travel distance between the backlight light boards 121 and the diffusing plate 160 will become shorter, so light cannot be effectively mixed before exiting the diffusing plate 160, thereby causing poor light extraction uniformity.

In the actual manufacturing process, the spacing between the diffusing plate 160 and the backlight light boards 121 may be set as 25 mm, 28 mm, 30 mm, 32 mm, or 35 mm. Therefore, the spacing between the diffusing plate 160 and the backlight light boards 121 can be prevented from being overly large, a sufficient light travel distance between the diffusing plate 160 and the backlight light boards 121 can also be ensured, which allows light to be well mixed before exiting the diffusing plate 160, thereby improving the light extraction uniformity. The spacing between the diffusing plate 160 and the backlight light boards 121 can be adjusted according to actual application requirements, and is not specifically limited herein.

Optionally, the backlight light board assembly 120 includes a plurality of backlight light boards 121, the splicing gap 1212 is defined between any two adjacent backlight light boards 121, and the reflective layer 130 and the light-transmitting layer 140 are disposed corresponding to each splicing gap 1212, so the light extraction effect of positions corresponding to each splicing gap 1212 can be adjusted, thereby improving the overall light extraction effect of the backlight module 100.

Since each splicing gap 1212 is correspondingly provided with the reflective layer 130 and the light-transmitting layer 140, that is, a plurality of protruding structures are disposed on the backlight light board assembly 120, when disposing the diffusing plate 160, the diffusing plate 160 can abut a plurality of light-transmitting layers 140 in a same layer at a same time, thereby improving the stability of the diffusing plate 160 on the light-transmitting layers 140, thereby being beneficial to fix the diffusing plate 160 and improving the overall structural stability of the backlight module 100.

It should be noted that when splicing, the backlight light boards 121 may be spliced in a parallel arrangement in one direction, or may be spliced in an array. A number of the backlight light boards 121 included in the backlight light board assembly 120 and the way of splicing with each other can be adjusted according to actual design requirements, and are not specifically limited herein. Wherein, two adjacent backlight light boards 121 can be directly bonded, which is simple and convenient, and the bonding method and position can be adjusted according to design requirements, thereby allowing the splicing method of the backlight light board assembly 120 to be more flexible and diverse to satisfy different design requirements.

An embodiment of the present disclosure further provides the display device. The display device includes the backlight module. A specific structure of the backlight module can refer to the above embodiments. Since the display device adopts all technical solutions of all the foregoing embodiments, it has at least all the beneficial effects brought about by the technical solutions of the foregoing embodiments. Therefore, it will not be repeated here.

Figure 5:
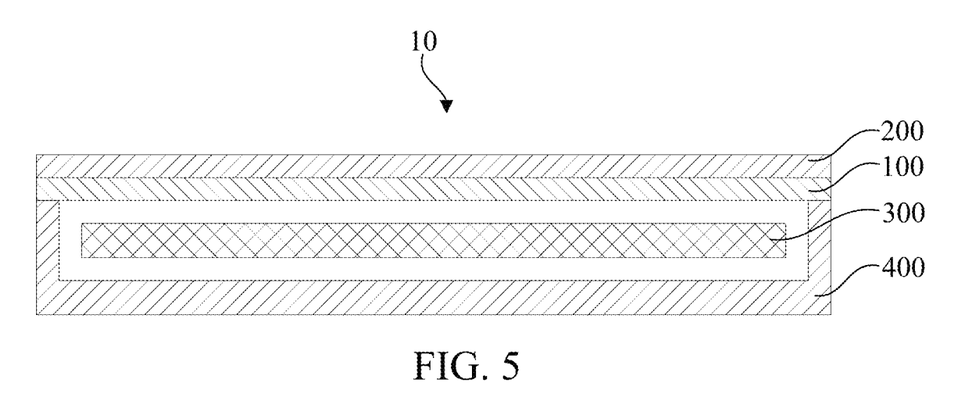
FIG. 5 is a schematic structural diagram of a display device according to an embodiment of the present disclosure.

FIG. 5 is a schematic structural diagram of the display device according to an embodiment of the present disclosure. As shown in FIG. 5, the display device 10 includes the backlight module 100, a display screen 200, a driving circuit 300, and a housing 400. The display screen 200 is disposed on a light-emitting side of the backlight module 100 and is connected to the backlight module 100. The backlight module 100 can emit light uniformly on the entire light-emitting side and is configured to provide the display screen 200 with light that is recombined and distributed uniformly, so that the display screen 200 can display images normally. The housing 400 is connected to the display screen 200 to support and fix the display screen 200, and the driving circuit 300 is disposed in the housing 400 and is electrically connected to the display screen 200 to control the display screen 200 to display images.

It should be noted that the display device 10 in the embodiment of the present disclosure may be any product or component having a display function, such as a mobile phone, a computer, a digital camera, a digital video camera, a game console, an audio reproduction device, an information terminal, a smart wearable device, a smart weighing scale, a car monitor, a television, etc.

In the above embodiments, the description of each embodiment has its own emphasis. For the parts that are not described in detail in an embodiment, can refer to the detailed description of other embodiments above.

The backlight module and the display device provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A backlight module, comprising:
    a backlight light board assembly comprising at least two backlight light boards spliced to each other, wherein a splicing gap is defined between two backlight light boards spliced to each other, and the at least two backlight light boards have a light-emitting surface;
    a reflective layer disposed on the light-emitting surface of the at least two backlight light boards and covering the splicing gap;
    a light-transmitting layer disposed on one side of the reflective layer away from the splicing gap; and the light-transmitting layer comprises
    a plurality of light-transmitting layers disposed in a stack in a direction away from the backlight light board assembly, wherein refractive indexes of two adjacent light-transmitting layers are different.

2. The backlight module according to claim 1, wherein the reflective layer has a side surface extending along a length direction of the splicing gap, and the light-transmitting layer extends to the light-emitting surface of the at least two backlight light boards along the side surface.

3. The backlight module according to claim 1, wherein refractive indexes of the light-transmitting layers are all different.

4. The backlight module according to claim 1, wherein refractive indexes of the light-transmitting layers increase in a direction away from the reflective layer in sequence, or
the refractive indexes of the light-transmitting layers decrease in the direction away from the reflective layer in sequence.

5. The backlight module according to claim 1, wherein one side of the reflective layer away from the backlight light board assembly is a convex surface, or one side of the light-transmitting layer away from the reflective layer is a convex surface.

6. The backlight module according to claim 1, wherein a total thickness of the light-transmitting layers ranges from 1 mm to 2 mm.

7. The backlight module according to claim 1, comprising a light-transmitting adhesive layer connecting the reflective layer to the light-transmitting layers.

8. The backlight module according to claim 7, wherein another light-transmitting adhesive layer is disposed between two adjacent light-transmitting layers.

9. The backlight module according to claim 7, wherein refractive indexes of the light-transmitting adhesive layer and the light-transmitting layers are different.

10. The backlight module according to claim 1, wherein a material of the light-transmitting layer comprises acrylic, and a material of the reflective layer comprises polycarbonate or polyethylene terephthalate.

11. The backlight module according to claim 1, further comprising a backplate and a connecting part, wherein one side of the backlight light board assembly away from the reflective layer is attached to the backplate, and the connecting part is disposed in the splicing gap and connects the reflective layer to the backplate.

12. The backlight module according to claim 11, wherein one side of the reflective layer facing the connecting part is provided with a first positioning slot, one side of the connecting part facing the reflective layer is provided with a first positioning part that protrudes corresponding to the first positioning slot, and the first positioning part is inserted into the first positioning slot; or
the side of the connecting part facing the reflective layer is provided with a second positioning slot, the side of the reflective layer facing the connecting part is provided with a second positioning part that protrudes corresponding to the second positioning slot, and the second positioning part is inserted into the second positioning slot.

13. The backlight module according to claim 12, wherein one side of the backplate facing the connecting part is provided with a third positioning slot, the connecting part is provided with a third positioning part that protrudes corresponding to the third positioning slot, and the third positioning part is inserted into the third positioning slot; or
one side of the connecting part facing the backplate is provided with a fourth positioning slot, the backplate is provided with a fourth positioning part that protrudes corresponding to the fourth positioning slot, and the fourth positioning part is inserted into the fourth positioning slot.

14. The backlight module according to claim 11, comprising a plurality of connecting parts disposed in the splicing gap and arranged at intervals along a length direction of the splicing gap.

15. The backlight module according to claim 11, wherein the connecting part is in strip shape and extends along a length direction of the splicing gap.

16. The backlight module according to claim 1, further comprising a diffusing plate disposed on one side of the light-transmitting layer away from the backlight light board assembly, wherein a spacing between the diffusing plate and the at least two backlight light boards ranges from 25 mm to 35 mm.

17. The backlight module according to claim 16, wherein the backlight light board assembly comprises a plurality of backlight light boards, the splicing gap is defined between any two adjacent backlight light boards, the reflective layer and the light-transmitting layer are disposed corresponding to each splicing gap, and the diffusing plate abuts the light-transmitting layer.

18. The backlight module according to claim 17, wherein the backlight light boards are arranged in an array.

19. A display device, comprising a display screen and the backlight module, wherein the display screen is connected to the backlight module, and
wherein the backlight module comprises:
a backlight light board assembly comprising at least two backlight light boards spliced to each other, wherein a splicing gap is defined between two backlight light boards spliced to each other, and the at least two backlight light boards have a light-emitting surface;
a reflective layer disposed on the light-emitting surface of the at least two backlight light boards and covering the splicing gap;
a light-transmitting layer disposed on one side of the reflective layer away from the splicing gap; and the light-transmitting layer comprises
a plurality of light-transmitting layers disposed in a stack in a direction away from the backlight light board assembly, wherein refractive indexes of two adjacent light-transmitting layers are different.

* * * * *